United States Patent
Murillo et al.

(10) Patent No.: US 11,494,953 B2
(45) Date of Patent: Nov. 8, 2022

(54) ADAPTIVE USER INTERFACE PALETTE FOR AUGMENTED REALITY

(71) Applicant: Microsoft Technology Licensing, LLC, Redmond, WA (US)

(72) Inventors: Oscar E. Murillo, Redmond, WA (US); William H. Robbins, Monroe, WA (US); Dylan Edmund Pierpont, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/458,927

(22) Filed: Jul. 1, 2019

(65) Prior Publication Data
US 2021/0004996 A1    Jan. 7, 2021

(51) Int. Cl.
*G06T 11/00*    (2006.01)
*G06T 7/90*    (2017.01)

(52) U.S. Cl.
CPC .............. *G06T 11/001* (2013.01); *G06T 7/90* (2017.01); *G06T 2200/24* (2013.01); *G06T 2207/10024* (2013.01)

(58) Field of Classification Search
CPC ..... G06T 11/001; G06T 7/90; G06T 2200/24; G06T 2207/10024
See application file for complete search history.

(56) References Cited

U.S. PATENT DOCUMENTS

| | | | | | |
|---|---|---|---|---|---|
| 5,254,978 | A | * | 10/1993 | Beretta | G01J 3/52 715/974 |
| 5,311,212 | A | * | 5/1994 | Beretta | G06F 3/04845 715/974 |
| 5,343,311 | A | * | 8/1994 | Morag | G06T 11/001 358/500 |

(Continued)

OTHER PUBLICATIONS

Gabbard, et al., "Usability Engineering for Augmented Reality: Employing User-Based Studies to Inform Design", In IEEE Transactions on Visualization and Computer Graphics, vol. 14, Issue 3, May 1, 2008, pp. 513-525.

(Continued)

*Primary Examiner* — Charles L Beard
(74) *Attorney, Agent, or Firm* — Alleman Hall Creasman & Tuttle LLP

(57) ABSTRACT

An augmented reality device comprising a camera, an augmented reality display, and a controller. The augmented reality display is configured to display the real-world environment and one or more virtual augmentations. The controller is configured to measure, via determination of hue, a color profile for a displayed portion of the real-world environment visible via the augmented reality display and imaged via the camera. A complementary palette of user interface colors is selected, each of such user interface colors having at least a predefined difference in hue relative to one or more colors in the color profile. An augmented reality feature is visually presented via the augmented reality display at a render location and with a render color from the (Continued)

complementary palette of user interface colors, the render color having at least the predefined difference in hue relative to a real-world environment color corresponding to the render location.

20 Claims, 10 Drawing Sheets

(56) References Cited

U.S. PATENT DOCUMENTS

| | | | | |
|---|---|---|---|---|
| 5,420,607 A * | 5/1995 | Miller | G06F 3/03542 | 345/156 |
| 5,909,220 A * | 6/1999 | Sandow | G06T 11/001 | 345/589 |
| 6,563,510 B1 | 5/2003 | Rice | G01J 3/463 | 345/589 |
| 6,963,425 B1 * | 11/2005 | Nair | G06K 9/4652 | 358/1.9 |
| 7,180,524 B1 * | 2/2007 | Axelrod | G06T 11/001 | 715/810 |
| 8,418,059 B2 * | 4/2013 | Kitada | G06F 3/04847 | 715/275 |
| 8,619,082 B1 * | 12/2013 | Ciurea | H04N 13/243 | 345/427 |
| 8,768,046 B2 * | 7/2014 | Ernst | G06T 7/251 | 382/154 |
| 8,860,748 B2 * | 10/2014 | Campbell | G06K 9/66 | 345/593 |
| 9,361,732 B2 * | 6/2016 | Ebstyne | G02B 27/017 | |
| 9,430,038 B2 * | 8/2016 | Ebstyne | G06T 19/006 | |
| 9,541,996 B1 * | 1/2017 | Baxter | G06F 3/011 | |
| 9,595,297 B2 * | 3/2017 | Mertens | G11B 27/11 | |
| 9,652,897 B2 * | 5/2017 | Osborn | G06T 11/40 | |
| 9,691,161 B1 * | 6/2017 | Yalniz | G06T 7/194 | |
| 9,727,977 B2 * | 8/2017 | Mullins | G06T 7/90 | |
| 9,884,254 B2 * | 2/2018 | Yim | A63F 13/2145 | |
| 9,911,242 B2 * | 3/2018 | Sundaresan | G06T 19/006 | |
| 10,109,051 B1 * | 10/2018 | Natesh | G06V 10/56 | |
| 10,204,458 B2 * | 2/2019 | Osborn | G06T 7/90 | |
| 10,401,227 B2 * | 9/2019 | Harada | H04N 1/48 | |
| 10,440,203 B2 * | 10/2019 | Saito | H04N 1/00246 | |
| 10,482,665 B2 * | 11/2019 | Copic | G06F 3/011 | |
| 10,509,865 B2 * | 12/2019 | Hackett | G06F 3/017 | |
| 10,529,300 B1 * | 1/2020 | Walters | G06T 7/90 | |
| 10,559,121 B1 * | 2/2020 | Moudgil | G06T 15/50 | |
| 10,572,988 B1 * | 2/2020 | Chaturvedi | G06T 7/0006 | |
| 10,607,567 B1 * | 3/2020 | Schritter | G09G 5/06 | |
| 10,692,287 B2 * | 6/2020 | Evans | G06T 19/006 | |
| 10,706,317 B2 * | 7/2020 | Weigel | G06V 10/56 | |
| 10,762,371 B1 * | 9/2020 | Walters | G06V 10/507 | |
| 10,789,699 B2 * | 9/2020 | Chaturvedi | G06Q 30/0643 | |
| 10,853,839 B1 * | 12/2020 | Galep | G06Q 30/0244 | |
| 10,885,701 B1 * | 1/2021 | Patel | A63F 13/57 | |
| 11,017,611 B1 * | 5/2021 | Mount | G06V 20/20 | |
| 11,055,759 B1 * | 7/2021 | Natesh | G06F 16/9535 | |
| 11,126,845 B1 * | 9/2021 | Chaturvedi | H04N 5/23218 | |
| 2003/0025835 A1 * | 2/2003 | Segman | H04N 9/68 | 348/703 |
| 2003/0083850 A1 * | 5/2003 | Schmidt | G06T 7/001 | 702/189 |
| 2003/0182072 A1 * | 9/2003 | Satoh | G06T 7/80 | 702/95 |
| 2004/0133379 A1 * | 7/2004 | Kobayashi | G06F 3/04815 | 702/127 |
| 2005/0001852 A1 * | 1/2005 | Dengler | H04N 5/2723 | 345/633 |
| 2006/0033880 A1 | 2/2006 | Korneluk | | |
| 2007/0109315 A1 * | 5/2007 | Rice | G06T 11/001 | 345/593 |
| 2010/0142805 A1 * | 6/2010 | Maxwell | G06T 7/11 | 382/164 |
| 2011/0128562 A1 * | 6/2011 | Anazawa | G06F 3/04847 | 358/1.9 |
| 2011/0170768 A1 * | 7/2011 | Alldrin | G06T 7/162 | 382/159 |
| 2012/0314129 A1 * | 12/2012 | Mertens | H04N 19/186 | 348/474 |
| 2013/0002698 A1 * | 1/2013 | Geiger | G06F 3/147 | 345/589 |
| 2013/0022264 A1 * | 1/2013 | Atsmon | G06T 7/90 | 382/165 |
| 2013/0235398 A1 * | 9/2013 | Bhatti | G06V 10/56 | 358/1.9 |
| 2013/0243312 A1 * | 9/2013 | Sato | G06T 7/90 | 382/164 |
| 2013/0293531 A1 * | 11/2013 | Cao | H04N 13/327 | 345/419 |
| 2014/0075324 A1 | 3/2014 | Howard et al. | | |
| 2014/0125668 A1 * | 5/2014 | Steed | G06T 19/006 | 345/426 |
| 2014/0267367 A1 * | 9/2014 | Chong | H04N 1/60 | 345/595 |
| 2014/0292811 A1 * | 10/2014 | Takayama | G06T 15/50 | 345/633 |
| 2015/0084855 A1 * | 3/2015 | Song | G06F 3/017 | 345/156 |
| 2015/0104107 A1 * | 4/2015 | Wolk | G06V 20/62 | 382/224 |
| 2015/0106699 A1 * | 4/2015 | Somasundaram | G06F 40/169 | 715/244 |
| 2015/0138223 A1 * | 5/2015 | Sorkine Hornung | H04N 9/73 | 345/591 |
| 2015/0241358 A1 * | 8/2015 | Burg | G01N 33/52 | 422/402 |
| 2015/0260474 A1 * | 9/2015 | Rublowsky | A63F 13/837 | 434/16 |
| 2015/0317832 A1 * | 11/2015 | Ebstyne | G02B 27/017 | 345/633 |
| 2015/0347854 A1 * | 12/2015 | Bare | G06K 9/00671 | 345/633 |
| 2015/0379004 A1 * | 12/2015 | Sayre, III | G06F 16/54 | 707/772 |
| 2015/0379005 A1 * | 12/2015 | Dorner | G06F 16/58 | 707/772 |
| 2016/0003636 A1 * | 1/2016 | Ng-Thow-Hing | G08G 1/167 | 701/26 |
| 2016/0033772 A1 * | 2/2016 | Han | H04N 1/6083 | 359/630 |
| 2016/0055330 A1 * | 2/2016 | Morishita | G06F 1/163 | 726/19 |
| 2016/0078680 A1 * | 3/2016 | Reif | G06F 1/163 | 345/633 |
| 2016/0171767 A1 * | 6/2016 | Anderson | G06F 3/011 | 345/633 |
| 2016/0189397 A1 * | 6/2016 | Mullins | G06T 7/90 | 345/633 |
| 2016/0217323 A1 * | 7/2016 | Takeuchi | A63F 13/428 | |
| 2016/0232686 A1 * | 8/2016 | Park | G06T 11/001 | |
| 2016/0371886 A1 * | 12/2016 | Thompson | G06T 11/203 | |
| 2016/0371888 A1 * | 12/2016 | Wright | G06F 3/017 | |
| 2016/0379418 A1 * | 12/2016 | Osborn | G03H 1/08 | 345/589 |
| 2017/0010662 A1 * | 1/2017 | Nishizawa | H04B 5/0031 | |
| 2017/0032542 A1 * | 2/2017 | Shankar | G06F 3/0484 | |
| 2017/0109932 A1 * | 4/2017 | Fujimoto | G06K 9/00671 | |
| 2017/0140252 A1 * | 5/2017 | Stucki | G06K 9/4652 | |
| 2017/0221276 A1 * | 8/2017 | Osborn | G06T 11/40 | |
| 2017/0289529 A1 * | 10/2017 | Carollo | H04N 13/398 | |
| 2017/0293349 A1 * | 10/2017 | Mason | G06F 3/011 | |
| 2017/0318178 A1 * | 11/2017 | Debevec | H04N 1/6086 | |
| 2017/0367582 A1 * | 12/2017 | Wang | A61B 1/0646 | |
| 2018/0012411 A1 * | 1/2018 | Richey | G06T 19/006 | |
| 2018/0025477 A1 * | 1/2018 | Min | H04N 1/6027 | 345/590 |
| 2018/0027132 A1 * | 1/2018 | Yamasaki | H04N 1/00408 | 358/504 |
| 2018/0075658 A1 * | 3/2018 | Lanier | G06F 1/163 | |
| 2018/0122103 A1 * | 5/2018 | Chen | G06T 11/001 | |
| 2018/0176483 A1 * | 6/2018 | Knorr | H04N 5/23222 | |
| 2018/0182161 A1 * | 6/2018 | Chaudhari | G06T 11/001 | |

(56) References Cited

U.S. PATENT DOCUMENTS

| | | | |
|---|---|---|---|
| 2018/0190019 A1* | 7/2018 | Glynn | G06T 11/60 |
| 2018/0204525 A1* | 7/2018 | Comps | G09G 3/2003 |
| 2018/0232934 A1* | 8/2018 | Schmidt | G06F 3/011 |
| 2018/0260843 A1* | 9/2018 | Hiranandani | G06K 9/6274 |
| 2018/0315248 A1* | 11/2018 | Bastov | G06T 19/006 |
| 2019/0012511 A1* | 1/2019 | Weaver | G03B 15/05 |
| 2019/0019312 A1* | 1/2019 | Yuan | G06K 9/00288 |
| 2019/0035321 A1* | 1/2019 | Xu | G09G 3/2003 |
| 2019/0043267 A1* | 2/2019 | Anderson | G06F 1/163 |
| 2019/0096073 A1* | 3/2019 | Nishimura | G06T 1/20 |
| 2019/0096129 A1* | 3/2019 | Rhodes | G06T 19/006 |
| 2019/0172415 A1* | 6/2019 | Davis | G09G 3/2003 |
| 2019/0206119 A1* | 7/2019 | Nam | G06T 19/006 |
| 2019/0304008 A1* | 10/2019 | Cen | G06Q 30/0629 |
| 2019/0311424 A1* | 10/2019 | Malkosh | G06F 16/5866 |
| 2019/0324541 A1* | 10/2019 | Rihn | G06F 3/04815 |
| 2019/0340649 A1* | 11/2019 | Ayush | G06V 10/507 |
| 2019/0371279 A1* | 12/2019 | Mak | G09G 5/38 |
| 2020/0020138 A1* | 1/2020 | Smith | G06F 3/013 |
| 2020/0074601 A1* | 3/2020 | Tajbakhsh | G06T 7/90 |
| 2020/0117336 A1* | 4/2020 | Mani | G06F 3/0304 |
| 2020/0134811 A1* | 4/2020 | Chaturvedi | G06T 19/20 |
| 2020/0143570 A1* | 5/2020 | Guido-Clark | G06F 40/279 |
| 2020/0150432 A1* | 5/2020 | Makino | G06T 11/00 |
| 2020/0160567 A1* | 5/2020 | Vallespi | G06T 11/001 |
| 2020/0175247 A1* | 6/2020 | Weaver | H04N 5/2354 |
| 2020/0184222 A1* | 6/2020 | Mizerak | G06T 19/20 |
| 2020/0193648 A1* | 6/2020 | Wyble | G06T 7/90 |
| 2020/0249819 A1* | 8/2020 | Berquam | G06T 19/006 |
| 2020/0258144 A1* | 8/2020 | Chaturvedi | G06T 7/50 |
| 2020/0273090 A1* | 8/2020 | Ayush | G06T 19/20 |
| 2020/0287624 A1* | 9/2020 | Darbi | H04J 14/02 |
| 2020/0357146 A1* | 11/2020 | Vallespi | G06F 3/04847 |
| 2020/0367970 A1* | 11/2020 | Qiu | G16H 50/50 |
| 2020/0387287 A1* | 12/2020 | Ravasz | G06F 3/04815 |
| 2020/0388071 A1* | 12/2020 | Grabner | G06T 17/00 |
| 2020/0410772 A1* | 12/2020 | Silverstein | G06T 19/006 |
| 2021/0004995 A1* | 1/2021 | Burg | G01J 3/463 |
| 2021/0065459 A1* | 3/2021 | Wyble | G06T 19/006 |
| 2021/0133850 A1* | 5/2021 | Ayush | G06Q 30/0631 |
| 2021/0142531 A1* | 5/2021 | Echevarria Vallespi | G09B 5/06 |
| 2021/0142532 A1* | 5/2021 | Echevarria Vallespi | G06T 11/001 |
| 2021/0224889 A1* | 7/2021 | Colby | G06Q 30/0643 |
| 2021/0280150 A1* | 9/2021 | Guo | G09G 5/024 |

OTHER PUBLICATIONS

Hincapié-Ramos, et al., "SmartColor: Real-Time Color Correction and Contrast for Optical See-Through Head-Mounted Displays", In Proceedings of IEEE International Symposium on Mixed and Augmented Reality, Sep. 10, 2014, pp. 187-194.

"International Search Report and Written Opinion Issued in PCT Application No. PCT/US20/034111", dated Jul. 29, 2020, 10 Pages.

* cited by examiner

ADAPTIVE USER INTERFACE PALETTE FOR AUGMENTED REALITY

BACKGROUND

Augmented reality is increasingly used to display augmentations along with real-world features. However, displaying augmentations in close proximity to real-world features may impact visibility of either or both of the augmentations and/or the real-world features.

SUMMARY

An augmented reality device comprises a camera, an augmented reality display, and a controller. The augmented reality display is configured to display the real-world environment and one or more virtual augmentations. The controller is configured to measure, via determination of hue, a color profile for a displayed portion of the real-world environment visible via the augmented reality display and imaged via the camera. A complementary palette of user interface colors is selected, each of such user interface colors having a predefined difference in hue relative to one or more colors in the color profile. An augmented reality feature is visually presented via the augmented reality display at a render location and with a render color from the complementary palette of user interface colors, the render color having a predefined difference in hue relative to a color measured for the real-world environment corresponding to the render location.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Augmented reality (AR) devices are increasingly used to display virtual augmentation content (herein referred to as "augmentations") along with real-world imagery corresponding to real-world features in a surrounding environment. Augmentations may be any suitable graphical content that can be displayed in the context of the real-world features. Non-limiting examples of augmentations include user interface (UI) content, as well as any other suitable graphical content (e.g., multimedia, lighting effects, background texture effects, etc.).

Augmentations may be used to facilitate interaction related to the real-world features, for example via UI augmentations. Non-limiting examples of UI augmentations include display overlays (e.g., heads-up display), interactive virtual objects, selectable indicators (e.g., associated with virtual and/or real-world features), etc. For example, a user may gaze at UI augmentations, use a controller device, and/or select the UI augmentations in any suitable manner, in order to perform an action related to the real-world features and/or perform an action in the virtual environment presented along with the real-world features.

Accordingly, the present disclosure includes systems and methods for adaptively selecting a color palette for augmented reality UI. The colors in the surrounding environment are measured to determine a color profile including a plurality of representative colors, and the color profile is used to select complementary colors which are specially adapted for the palette. For example, the colors in the palette may be selected based on having a sufficiently different hue from colors in the color profile. Accordingly, colors in the palette may be visible relative to colors occurring in real-world imagery in the surrounding environment. A palette resulting from the techniques disclosed herein has a limited number of colors that can be used to provide a consistent visual appearance to the augmented reality UI, while enabling highly visible UI features that can be readily visually distinguished from the real-world imagery.

Figure 1:
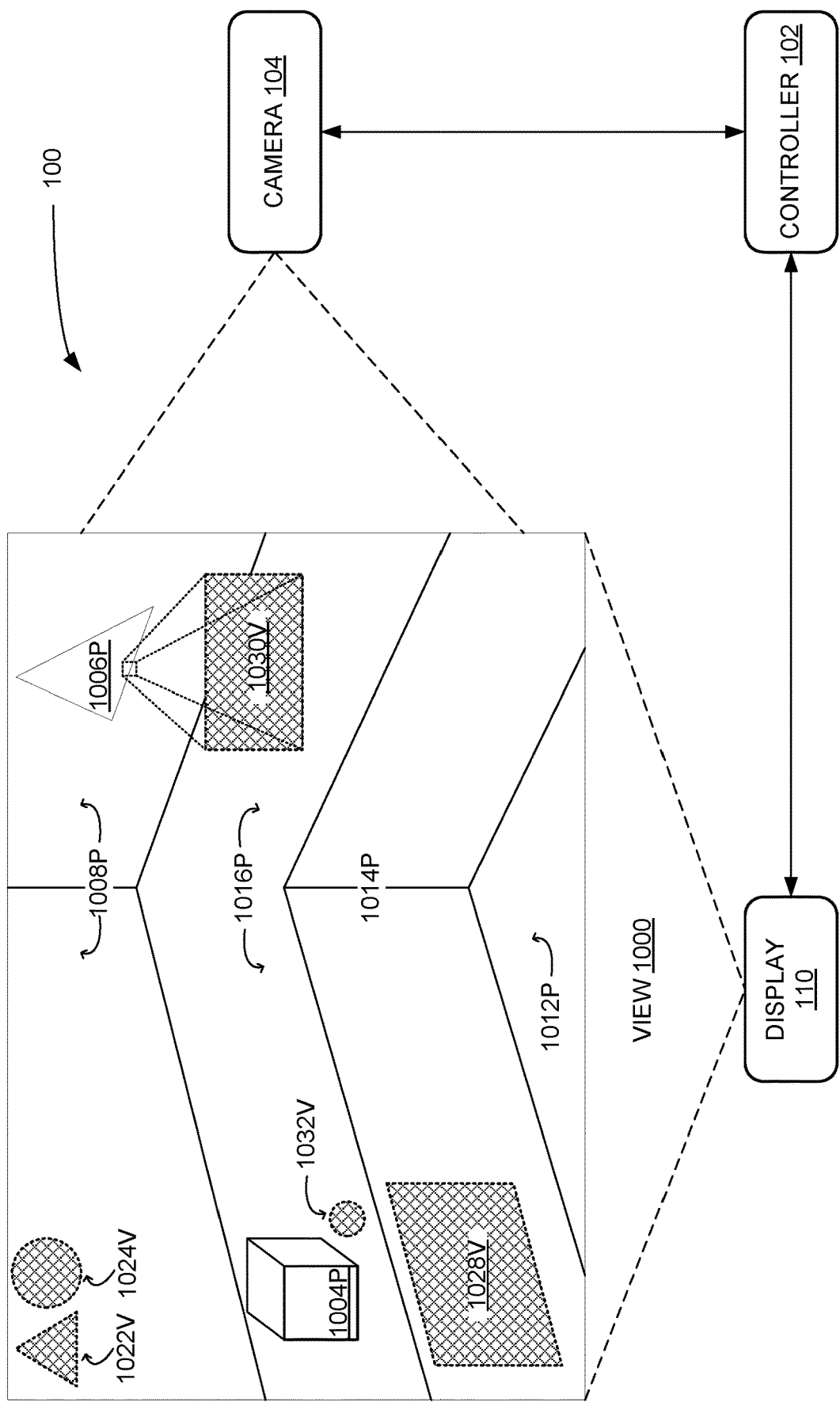
FIG. 1 shows an augmented reality system.

FIG. 1 shows a non-limiting example of an AR system 100, along with an exemplary view 1000 of virtual and real-world features via a display 110 of the AR system 100. AR system 100 includes a controller 102 configured to operatively couple with a camera 104 and display 110.

Display 110 is an augmented reality display configured to display a real-world environment and one or more virtual augmentations. Display 110 may be any suitable system of one or more augmented reality display devices. Non-limiting examples of augmented reality devices include transparent displays (e.g., see-through head mounted displays, car windshield UI) and/or displays configured to receive real-world imagery from a camera and visually present the real-world imagery via a mobile display device display (e.g., smart phone augmented reality application utilizing camera in smart phone, head mounted device with camera and display, etc.).

Camera 104 is a camera configured to image the real-world environment. Camera 104 may be any suitable sensor for imaging the real-world environment. For example, camera 104 may be a digital camera including one or more color sensors configured to detect specific bandwidths of visible light, e.g., a digital RGB camera with red, green, and blue (RGB) sensors. Camera 104 is configured to measure hue of the real-world environment. Optionally, in some examples, camera 104 may be configured to detect additional features of the real-world environment, for example, luminance, 3D distance to surfaces in the real-world environment, infra-red imagery of the real-world environment, etc. For example, camera 104 may include a depth camera (e.g., time-of-flight camera) and/or an infra-red camera.

Controller 102 may cause display 110 to display virtual features along with real-world imagery corresponding to real-world features. In some examples, display 110 is a transparent display and the real-world imagery is visible directly through the transparent display. In other examples, display 110 displays real-world features of the surrounding environment imaged by camera 104. In some examples, display 110 is configured to display real-world imagery including an indirect representation of the real-world features, e.g., displaying a virtual surface with the same geometry as real-world features but with a different color and/or texture. In other examples, the real-world imagery is a direct photographic representation of the real-world features.

View 1000 shows a simplified depiction of a work environment (e.g., a laboratory, kitchen, industrial processing plant, factory, or any other work environment). As a non-limiting example, display 110 may be a transparent head-mounted device, and accordingly, view 1000 may be a view presented through the transparent head-mounted device. View 1000 includes physical features and virtual features. The physical features are indicated with reference numbers with the suffix "P" and the virtual features are indicated with the suffix "V". For example, the physical features include a workbench with side workbench surfaces 1014P 1014P and top workbench surface 1016P, a container 1004P, a warning sign 1006P, walls 1008P, and a floor 1012P.

Controller 102 may utilize imaging by camera 104 to programmatically assess one or more features of the surrounding environment, for example, to determine relevant virtual content to be displayed. For example, view 1000 shows non-limiting examples of virtual content including two-dimensional (2D) overlay indicator 1022V, 2D overlay indicator 1024V, information pane 1028V, information pane 1030V, and interactive button 1032V.

In some examples, UI elements include 2D overlay elements, e.g., displayed as a 2D overlay parallel to the viewing plane shown in view 1000. For example, 2D overlay indicator 1022V and 1024V may be any suitable indicators, and are configured to be displayed in the top-left corner of the view, regardless of the current physical environment. As a non-limiting example, overlay indicator 1022V may be a warning pertaining to the physical environment, and overlay indicator 1024V may be an indicator pertaining to a battery life of a mobile display device.

In addition to 2D overlays, UI elements may be positioned in the 3D space corresponding to the surrounding environment. 3D UI elements may occupy any suitable volume (e.g., as defined by a 3D mesh, 3D curved surface, or in any other suitable manner), at any suitable position in 3D space relative to the real-world features of the current physical environment. For example, UI elements may be positioned in front of, on top of, beneath, behind, and/or adjacent to real-world features and/or other 3D UI elements. In some examples, UI elements may be positioned so as to appear to be floating in space. In some examples, UI elements may be transparent and/or translucent. In some examples, UI elements may occlude and/or contain real-world features (e.g., to present a different appearance for a real-world feature, hide a real-world feature, etc.).

For example, interactive button 1032V is positioned on workbench top 1016P near container 1004P. Information pane 1028V is positioned along the workbench side 1014P, also near container 1004P. Information pane 1030V is positioned floating in space in front of warning sign 1006P. The exemplary positionings of UI elements are non-limiting, and the UI elements could be presented in different positions. As non-limiting examples, instead of being on workbench top 1016P, interactive button 1032V could alternately be positioned on a wall, on an object, floating in space, etc.

In some examples, 3D UI elements are configured to display information and/or multimedia content. In some examples, 3D UI elements are configured to enable various modes of user interaction. Interactive objects may facilitate any suitable interactive behavior to work as virtual input devices for controlling display 110, camera 104, and/or controller 102, for example, responsive to user gaze, user hand or controller pointing at an interactive object, or responsive to user hand or controller motion through a volume occupied by the interactive object or a defined control area for the interactive object, etc. Accordingly, controller 102 may be configured to recognize any suitable interaction(s) with an interactive object and respond in any suitable manner.

As an example, information pane 1028V may be configured to show a notice indicating contents of container 1004P (e.g., test tubes) and summarizing currently known information regarding the contents (e.g., a number of test tubes of each of three different sizes). As another example, information pane 1030V may be configured to display additional information pertaining to warning sign 1006P. Information pane 1030V may, for example, be configured to show a still frame of information pertaining to warning sign 1006P, and then display an animated safety training video if the user gazes at it for three seconds. As a further example of possible behavior for information pane 1030V, if the user does not gaze at the area including information pane 1030V for a defined period of time (e.g., one minute), the information pane 1030V may be configured to recede to a smaller pane flush with the wall (e.g., positioned analogously to information pane 1028V). Similarly, if the user gazes at information pane 1028V for a defined period of time (e.g., three seconds), information pane 1028V may be configured to advance to a floating position in space, aligned with the viewing plane of the user (e.g., to be positioned analogously to information pane 1030V). In this manner, 3D objects such as information panes may be compactly arranged in the 3D space, while facilitating re-positioning for easy reading/interaction.

As another example, controller 1032V may be configured to recognize a virtual button press to button 1032V as a request to present new augmented reality content, e.g., to show a virtual model near button 1032V. The virtual button press may be recognized in any suitable manner, e.g., as a specific user gesture within a defined proximity of the button. In another example, controller 102 may be communicatively coupled to a computer network (e.g., the internet) and button 1032V may be configured to invoke an application programming interface over the computer network. For example, container 1004P may contain a consumable item (e.g., test tubes) and button 1032V may be configured to order a new shipment of the consumable item (e.g., order a new package of test tubes for restocking container 1004P). These examples are non-limiting. 3D and/or 2D UI augmentations may present any suitable information, and may be configured to allow any suitable interaction(s) according to state-of-the-art and future UI design techniques.

In other examples, augmented reality displays may present augmented reality features at a specific location in a physical environment via a display installed in and/or near the physical environment. For example, augmented reality device 110 may include a projector (e.g., projector lens, scanning lens projector, etc.) configured to project augmented reality features into a physical environment (e.g., against a flat, curved, and/or textured surface). In some examples, augmented reality displays may be configured to present augmented reality features via a fixed display in a physical environment (e.g., via a touchscreen console).

In some examples, display 110 may be configured to present content to a particular user (e.g., a wearer of a head-mounted device), at a particular vantage point (e.g., to a particular location in a workplace via projected features or fixed display). In some examples, augmented reality content may be visible to one or more users from one or more different vantage points, for example from a particular location via a projected feature and additionally via a mobile display device). In various examples, the same or different content may be presented at each component display device of display 110.

In some cases, presenting augmentations along with real-world imagery may impact visibility of the augmentations as well as the real-world imagery. For example, if coloration of the augmentations is similar to nearby real-world imagery, it may be difficult for a user to distinguish the augmentations from the real-world imagery.

Augmentations may be visually distinguished from the real-world imagery if the color of the augmentation is easily visible relative to the color of the surrounding real-world imagery. For example, two colors having sufficiently different hues may be highly distinguishable to a user. Sufficient difference in hue may be assessed in any suitable manner, for example, according to a predefined difference in hue angle (e.g., different by at least 75 degrees) or according to a perceptual model (e.g., according to a mathematical model of color perception taking one or more forms of colorblindness into account).

When presenting a UI element in the context of real-world imagery, it may be desirable to present the UI element with a color that has a sufficient difference in hue from the real-world imagery (e.g., at least a predefined difference in hue angle). However, it may also be desirable to constrain the presentation of different UI elements to use a limited palette including a predefined plurality of colors. For example, augmented reality applications may be configured to use a limited number of predefined colors (e.g., a color palette), to display different aspects of a UI. For example, user interfaces are often designed with color-coded properties indicated by distinct colors. As an example, a UI may include non-selectable text in a first color (e.g., black) and selectable, hyperlink text in a second, different color (e.g., blue). Furthermore, UI designers may wish to present a consistent visual aesthetic using a limited number of colors.

Accordingly, controller 102 is configured to cause display 110 to present UI augmentations using a complementary palette including a limited number of predefined colors. Controller 102 adaptively selects colors in the palette based on having a sufficient difference in hue from one or more colors in the environment (e.g., at least a predefined difference in hue angle), as will be described further below. The color palette can be used to give a distinctive appearance to aspects of the UI while also resulting in visual distinguishability of the UI from the surrounding environment.

Figure 2:
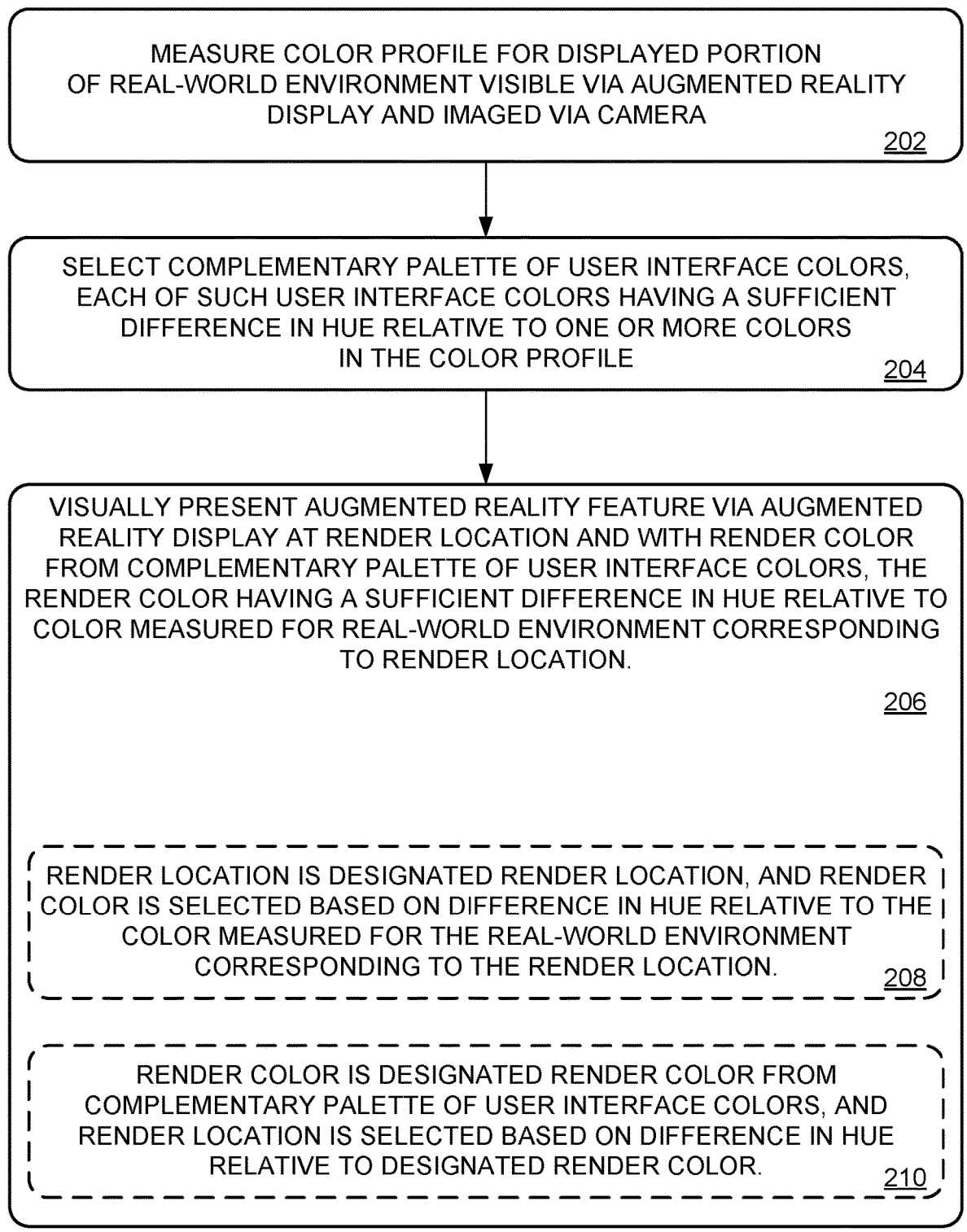
FIG. 2 shows an example method of selecting a color palette.

Turning now to FIG. 2, an exemplary method for adaptively selecting and using a complementary color palette is depicted. The method may be implemented in part via controller 102, and may be used for displaying augmentations in an easily-viewable manner along with a real-world environment. The colors in the palette are adaptively selected to improve visibility relative to real-world imagery, as will be described in further detail below. The color palette is suitable for UI design in which a specific color scheme is desired (e.g., to indicate color-coded properties or to achieve a consistent visual appearance, as described above), since it has a limited number of predefined colors. Furthermore, the color palette includes colors which have a sufficient difference in hue from one or more colors occurring in the real-world imagery (e.g., at least a predefined difference in hue angle). Accordingly, UI elements can be drawn using colors from the palette, and when the UI elements are presented along with real-world imagery, the usage of palette colors facilitates a visual presentation in which adjacent UI/real-world colors are sufficiently different in hue to be easily distinguished (e.g., adjacent UI/real-world colors have at least a predefined difference in hue angle).

Method 200 includes, at 202, measuring a color profile for a displayed portion of the real-world environment visible via the augmented reality display and imaged via the camera. Measuring the color profile may be performed in any suitable fashion, for example based on measuring at least hue values for locations in the real-world environment. As a non-limiting example, measuring the color profile may be based on sampling a plurality of color values from the surrounding environment. For example, the plurality of color values may be sampled from a plurality of different pixels in a 2D viewing plane corresponding to the view through the display and/or image captured by the camera. In some examples, measuring the color profile is based on mapping real-world environment colors to a predefined plurality of color buckets), as will be described in further detail below.

In some examples, measuring the color profile includes determining a field of view and/or periphery of a user corresponding to the displayed portion of the real-world environment. Field of view and/or periphery may be determined in any suitable fashion, for example, based on typical human field of view, field of view of a camera and/or lens included in a head mounted display, etc. Measuring the color profile may further include assessing a mesh for real-world features in the environment. For example, when using a depth camera as described above, assessing a mesh for a real-world feature may include determining a distance to plurality of points on a surface of a real-world feature, and assessing a mesh including the plurality of points and connecting lines/faces. In some examples, measuring the color profile may be based on determining a color for each vertex, edge, and/or face of the mesh.

Figure 3:
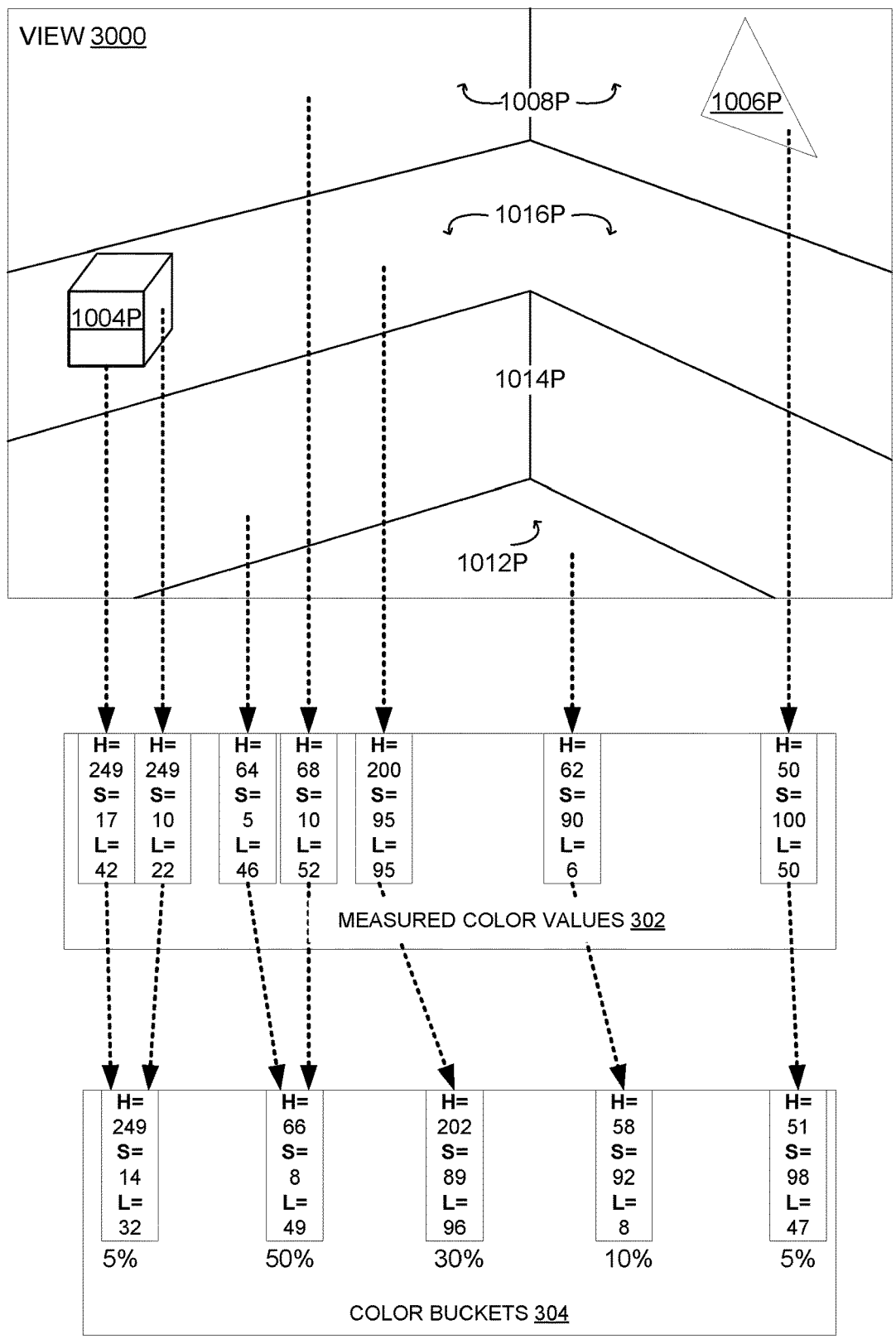
FIG. 3 shows an example measurement of a color profile.

FIG. 3 shows an example view 3000 of a physical environment imaged through a camera (e.g., camera 104), a plurality of measured color values 302 representing real-world environment colors, and a plurality of color buckets 304. Although the example image is shown as a line drawing, surfaces of the various objects depicted in view 3000 have various colors not depicted in the drawing. Accordingly, the dashed arrows from view 3000 to the measured color values 302 identify, for a plurality of locations in view 3000, corresponding color values represented as hue/saturation/luminance (HSL) values.

As shown, the container 1004P has two different colors shown by the leftmost two arrows: a first color with HSL values (H=249, S=17, L=42) indicating a blue-gray color, and a second color with HSL values (H=249, S=10, L=22) indicating a darker gray color. The depicted saturation (S) values and luminance (L) values are given as percentages, and the depicted hue (H) values are given as degrees (out of 360). Although the examples are shown with HSL values, color values may be measured in any suitable fashion, e.g., as RGB values or values in any other suitable color space, e.g., the CIELAB color space).

The workbench sides 1014P at the location indicated by the third arrow has a warmer, yellow-gray color (H=64, S=5, L=46). Although not depicted in FIG. 3, additional regions of the workbench may be sampled, for example, resulting in a measurement of similar warmer, yellow-gray colors (e.g., an additional region of the workbench could have a color such as (H=60, S=8, L=33) based on different lighting of that region of the workbench compared to the point indicated by the dashed arrow). The walls 1008P are measured to have a similar yellow-gray color, (H=68, S=10, L=52).

HSL values may be similarly obtained for any suitable number of sample locations on the workbench top 1016P, floor 1012P, and/or warning sign 1006P. Although one measurement is depicted for each such feature of the real-world environment, measured color values 302 may include any suitable number of measurements for each feature. For example, as described above, view 3000 may be regarded as a plurality of pixels in a uniform or non-uniform grid, and measured color values 302 may include one value for each pixel.

As shown in FIG. 3, the measured color values may be mapped into color buckets 304. Each color bucket 304 has a representative color, indicating a color or range of colors occurring in the surrounding environment. For example, the first color bucket on the left has a representative color (H=249, S=14, L=32) representing the range of blue-gray colors of container 1004P. As an example, the representative color may be computed as an average of the measured color values 302 contributing to that bucket. Other measured color values 302 are mapped into other color buckets each having a representative color, as depicted. The three rightmost color buckets are depicted with color values based on a contributing measured color value 302 as well as other measured color values not depicted in FIG. 3, so the color buckets have representative colors that differ slightly from the contributing measured color values 302. Although the color buckets in FIG. 3 are shown with HSL values for colors, color buckets may represent representative colors, ranges of colors, and/or statistical distributions of colors in any other suitable fashion. For example, instead of having HSL values for colors, color buckets may alternately represent only the hue of a color, without regard to saturation or luminance.

The HSL values sampled for different points in the environment may be mapped to any suitable number of color buckets, in any suitable fashion. In some examples, the number of color buckets is a predefined number (e.g., specified by the augmented reality display device and/or by an application operating on the augmented reality display device). In some examples, the number of color buckets is selected based on the colors measured for the environment (e.g., so as to pick a number of color buckets that corresponds to the number of recognizably distinct colors in the environments). For example, as the environment is measured at a new location, if a measured color is sufficiently similar to colors already assigned to a color bucket, it may be assigned to that color bucket, whereas if the measured color is dissimilar from colors in existing color buckets, it may be assigned to a new color bucket. The number of color buckets and assignment of colors to buckets may be defined computationally in any suitable fashion, for example, by a clustering algorithm.

In some examples, measuring the color profile further includes assessing, for each color bucket of the predefined plurality of color buckets, a proportion of the real-world environment corresponding to that color bucket. For example, as shown in FIG. 3, the color buckets 304 each have a corresponding proportion (shown beneath the representative color value). As depicted, the colors associated with container 1004P fall into a bucket corresponding to only 5% of the overall environment, whereas the colors associate with walls 1008P and workbench sides 1014P fall into a bucket corresponding to 50% of the overall environment.

In some examples, particular real-world surroundings may tend to have one or more prevalent colors that occur for many different real-world features. Real-world features having a particular color may have a range of different hue/saturation/luminance levels for the particular color, e.g., depending on lighting, surface texture, etc. Furthermore, multiple different real-world surfaces may have similar colors, e.g., multiple different surfaces may have slightly different tints of white while still all being recognizably white in color, or multiple different surfaces may have various shades of green that may be mutually indistinguishable or difficult to reliably distinguish for human viewers.

For example, a medical setting may have many different white surfaces (e.g., to improve ease of cleaning), as well as blue surfaces (e.g., to indicate sterility), green surfaces (e.g., to indicate containers having liquid contents), and/or red surfaces (e.g., to indicate biohazards). In another example, in a construction or repair setting, bright colors such as red and yellow may be used to indicate hazards (e.g., large moving equipment). In another example, a petroleum refinery or factory setting may be illuminated for yellow and/or green flood lighting (e.g., to promote calmness among human workers), resulting in many colors with a green and/or yellow tint. In another example, in a shipping/logistics setting, containers may be color-coded for identification using a limited selection of widely-recognized colors. In various other settings, real-world features and/or environmental lighting may result in the real-world surroundings having one or more predominant colors.

Accordingly, the color profile can have a relatively small number (e.g., fewer than 50, fewer than 25, or fewer than 10) of color buckets. In many examples, the number of color buckets may be 10 or fewer. Each color bucket represents one or more colors that occur in the real-world surroundings. In some examples, a color bucket may represent just one predominant color. In other examples, a color bucket may represent a range of similar colors (e.g., a representative "white" bucket for a range of different white and off-white colors).

Although FIG. 3 depicts an example in which the color profile is determined by assigning colors to color buckets, any other suitable state-of-the-art and/or future techniques may be used for determining a color profile. In some examples, the color profile includes a plurality of representative colors from the surrounding environment (e.g., analogous to the color buckets depicted in FIG. 3). In some examples, the color profile may be a statistical distribution and/or spectrum of colors in the environment. The color profile may be assessed in any suitable manner, for example, using a clustering algorithm, or using cinematographic techniques for color lookup tables.

Accordingly, at 204, method 200 includes adaptively selecting a complementary palette of user interface colors, each of such user interface colors having at least a predefined difference in hue relative to one or more colors in the color profile. The selection process for user interface colors in the complementary palette is adaptive with regard to the colors measured for the color profile. In other words, as the color profile changes (e.g., due to changed lighting conditions in the environment, changed/added/removed physical features in the environment, and/or due to moving the AR system to a different environment), the complementary palette is adapted to the new color profile, so that the user interface colors in the complementary palette remain visible despite the changed color profile. Accordingly, easily-visible augmentations may be drawn using colors from the complementary palette. The complementary color palette has a limited number of pre-defined colors, suitable for drawing UI elements (e.g., in a UI design in which a specific color scheme is desired to indicate color-coded properties or to achieve a consistent visual appearance, as described above). Furthermore, the colors are selected with regard to the environment so as to broadly complement a color profile of the environment. Accordingly, for any location in the environment, there is likely to be a good choice of at least one of the palette colors to enable good contrast/visibility with regard to that location. Where a bucket method is used for color profile determination, the number of colors in the complementary palette may be the same as the number of color buckets, greater than the number of color buckets, or fewer than the number of color buckets. The number of colors in the complementary palette may be determined in any suitable fashion, based on the number of color buckets (e.g., the same number of palette colors as there are color buckets, half as many palette colors as color buckets, or twice as many palette colors as color buckets) or as a predefined number of colors (e.g., an application-specified number of UI colors). In some examples, if a particular bucket is assessed to correspond to at least a threshold proportion (e.g., 50%) of the surrounding environment and/or to a largest proportion of the surrounding environment relative to other color buckets, accordingly, a large proportion of palette colors (e.g., 50%, 75% or 100%) of palette colors may be selected based on that bucket.

In the above examples, complementary palette colors are selected based on having at least a predefined difference in hue angle from color profile colors, a sufficient difference in hue between two colors may be determined in any other suitable fashion, with regard to visual distinguishability of the two colors. In some examples, complementary palette colors are selected based on having at least a predefined difference in luminance from profile colors (e.g., a difference of 50%).

In some examples, sufficient difference in hue of the render color relative to the color measured for the real-world environment corresponding to the designated render location includes a predefined difference in hue angle, e.g., a threshold difference. In some examples, the predefined difference in hue angle is between 90 and 270 degrees. In some examples, the predefined difference in hue angle is between 160 and 200 degrees. In some examples, the predefined difference in hue angle is between 175 and 185 degrees (e.g., within plus or minus 5 degrees of 180 degrees).

In some examples, sufficient difference in hue may be defined in relative terms with regards to different candidate colors for a palette. As an example, selecting the complementary palette may include ranking each user interface color of the complementary palette based on difference in hue between the user interface color and the color measured for the real-world environment corresponding to the designated render location. Accordingly, the selected render color may be among a predefined number of highest ranked colors, e.g., the highest ranked color.

"Complementary" is used herein to refer to any pair of colors that are highly visibly distinguishable relative to one another, for example, due to having a at least a predefined difference in hue angle. As an example, complementary may be used to refer to two colors that have a difference in hue of approximately 180 degrees (e.g., between 160 and 200 degrees). In some examples, complementary may refer more generally to two colors that have any other suitable predefined difference in hue, for example a difference of approximately 45 degrees. In some examples, complementary colors may be computed by complementing an RGB value for the color (e.g., for 8-bit RGB values, subtracting each RGB value from the maximum value of 255). In some examples, complementary colors may be computed by a predefined shift in hue (e.g., a 90 degree shift or a 180 degree shift). Alternately or additionally, complementary colors may be computed by complementing the saturation and/or luminance of the color (e.g., for a luminance represented as a percentage, subtracting the percentage from 100).

Figure 4A:
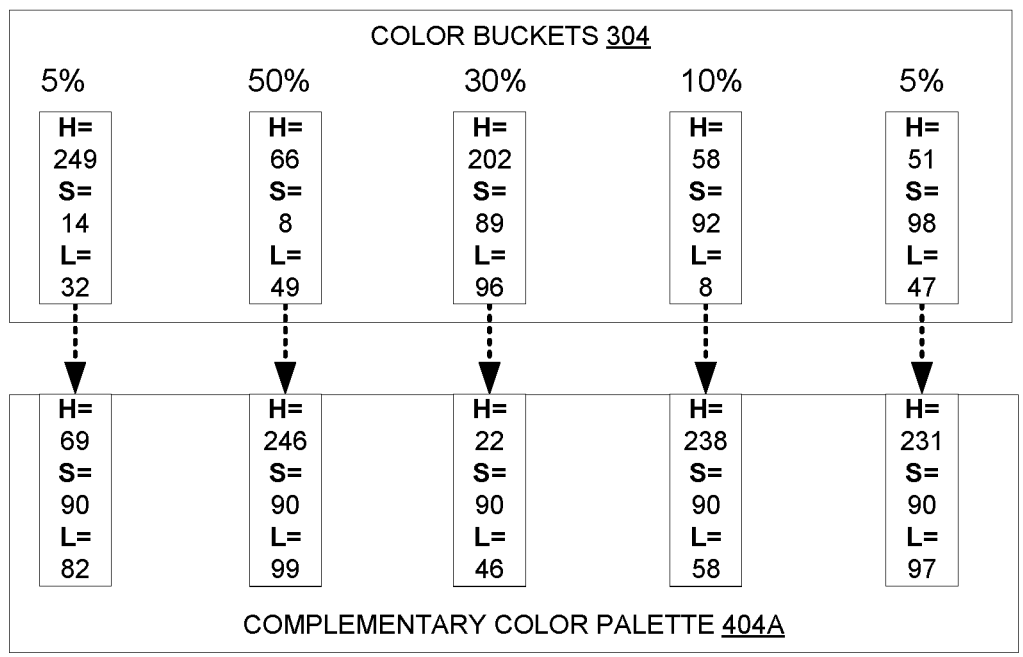
FIG. 4A-4C show an example selections of a complementary color palette based on a color profile.

FIG. 4A shows an exemplary selection of complementary palette colors 404A based on color buckets 304. Complementary palette colors may be selected based on a color profile, with regard to the complementary palette colors having a sufficient difference from the color profile in hue, saturation, and/or luminance. FIG. 4A shows an example in which complementary palette colors are selected with a hue angle based on the color profile (e.g., with at least a predefined difference in hue relative to the color profile), a luminance based on the color profile (e.g., with at least a predefined difference in luminance relative to the color profile), and a fixed saturation. However, the example depicted in FIG. 4A is non-limiting. Other methods of selection based on any combination of hue angle, luminance, and/or saturation are also within the scope of this disclosure. For example, instead of selecting luminance based on the color profile and using a fixed saturation, an alternate method of selecting the complementary palette could include selecting the hue angle based on sufficient difference from the color profile, the luminance based on a fixed value, and the saturation based on sufficient difference from the color profile.

As shown in FIG. 4A, each of the complementary palette colors is a color with a difference in hue angle of 180 degrees from a representative color of a corresponding color bucket. In the example, the complementary palette colors have a fixed saturation value of 90 irrespective of the corresponding color buckets, e.g., to use a consistent saturation value for UI elements which may improve visibility, prominence, and/or consistency of appearance of UI elements. For example, the leftmost palette color (H=69, S=90, L=68) is an orange color which would likely be highly visible relative to the blue-gray color of the container 1004 represented in the leftmost color bucket.

Figure 4B:
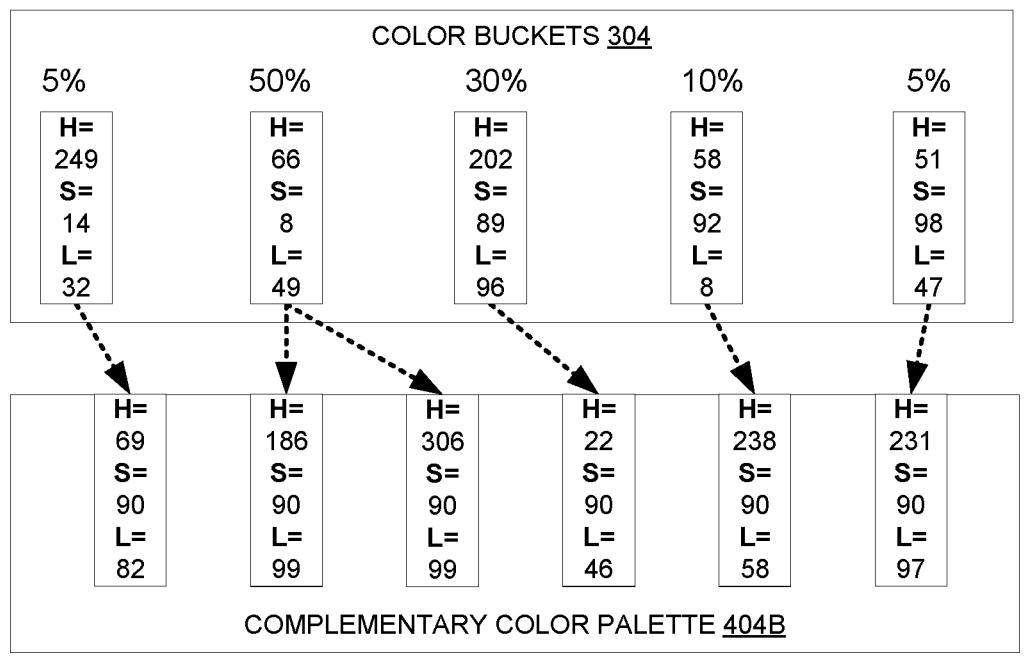

As depicted, complementary palette colors may be selected based on luminance relative to the color profile (e.g., in addition to the selection being based on hue). For example, each of the user interface palette colors of the complementary palette may have at least a predefined difference in luminance relative to one or more colors in the color profile (e.g., 50%). Accordingly, for each dark color in the color profile, a relatively light color is obtained for the palette and vice versa. As a non-limiting example, for a given profile color, if the luminance is above 50% then a different luminance for corresponding complementary palette color may be assessed by subtracting 50% from the luminance; similarly if the luminance is below 50%, then a different luminance for a corresponding complementary palette color may be assessed by adding 50% to the luminance, as shown in FIG. 4B. For example, the middle color bucket has a light color (H=202, S=89, L=96) and the corresponding complementary palette color has a dark color (H=22, S=90, L=46). Accordingly, for each color bucket in the color profile, there is a corresponding color in the complementary palette that is highly visually distinguishable. As such, since the color profile represents the predominant colors of the surrounding environment, for any location in the surrounding environment, it is likely that a color from the complementary palette could be used to visually present a UI element with good visibility due to having at least a predefined difference in hue from the corresponding color bucket.

FIG. 4B shows another example, but in which there are more colors in the complementary palette than there are color buckets. In some examples, as in FIG. 4B, a plurality of different user interface colors of the complementary palette may all be selected based on having at least a threshold difference in hue relative to one particular color bucket. Accordingly, selecting the complementary palette of user interface colors includes selecting a bucket of the predefined plurality of color buckets, and selecting a number of the user interface colors for the complementary palette based on the selected bucket. In some examples, the selected bucket corresponds to a largest proportion of the real-world environment relative to other buckets of the predefined plurality of color buckets. In some examples, the selected bucket is used for selecting a number of colors of the complementary palette that take up the same proportion of the complementary palette as the proportion of the environment corresponding to the selected bucket (e.g., when a bucket corresponds to 50% of the environment, 50% of the colors in the complementary palette are based on that bucket).

For example, the plurality of different user interface colors could all be selected based on a color bucket corresponding to a largest proportion of the real-world environment. For example, as shown in FIG. 4B the color bucket having color (H=66, S=8, L=49) that represents 50% of the real-world environment is mapped to two different colors with different hues (H=186, S=90, L=99) having a 120 degree difference in hue from the corresponding color bucket, and (H=306, S=90, L=99) having a 240 degree difference in hue from the corresponding color bucket. Accordingly, these different colors may have at least a predefined difference in hue angle (e.g., at least 90 degrees) from the corresponding color bucket and also from each other (e.g., difference of 120 degrees in each case).

Figure 4C:
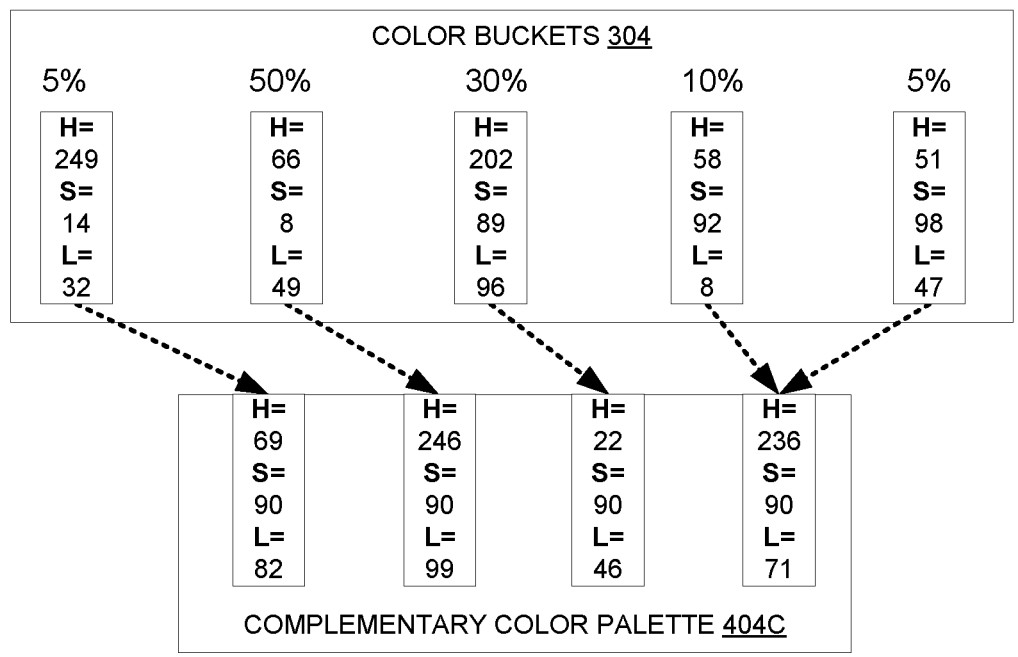

FIG. 4C shows another example, but in which there are fewer colors in the complementary palette than there are color buckets. In some examples, as in FIG. 4C, selecting one of the user interface colors of the complementary palette is based on weighted differences in hue between that color and a plurality of the color buckets of the predefined plurality of color bucket. As depicted, the rightmost color in the complementary color palette 404C is derived from the rightmost two different colors in the color buckets 304. Since the rightmost color bucket has a proportion of only half as much (5%) as the second-rightmost color bucket (10%), the rightmost complementary palette color may be influenced approximately twice as much by the difference from the second-rightmost color bucket as compared to the difference from the rightmost color bucket. The color has a hue (H=236) that is approximately 180 degrees different from each of the color bucket hues (H=58 and H=51). The hue (H=236) lies between a complementary hue for each color (e.g., between hues H=238 and H=231) but is approximately twice as close to the complementary hue for the more predominant color. As depicted, the complementary color also has a luminance (L=71) that is determined based on the weighted luminance of the color bucket colors, e.g., by adding 50% to the weighted average luminance of the color bucket colors (e.g., weighted average luminance L=21).

Although the example complementary color palettes 404A, 404B and 404C include only colors selected for the palette based on the color profile, a complementary color palette may be extended to include additional predefined colors independent of the color profile, for example, the palette could be augmented by adding a black color and a white color, or a designated specific red color.

In some examples, picking the color palette may include creating a number of shaders, for example, object-specific shaders or palette-specific shaders. Shaders simulate a material, for example they may designate a color as well as texture, how the material is affected by light, etc. Shaders may be precompiled and used by AR applications directly. In some examples, shaders may be used to replace a pre-defined shader in order to replace its appearance with a shader-defined appearance. For example, shaders may be executed by a graphical programming unit (GPU) as a replacement for predefined shaders. Replacing shaders in this fashion may enable visually presenting augmentations with colors from the complementary palette, even in the context of an augmented reality application in which augmentations were pre-defined with different colors without regard to the palette.

In some examples, shaders may designate a transparency value for a feature (e.g., indicating a transparency of a color used to present the feature). For example, in view 1000 of FIG. 1, information pane 1030V may be presented in a transparent color so that it is visible, while also permitting viewing of features behind it (e.g., room geometry of the scene in view 1000 may remain visible through the transparent pane). In some examples, a transparency level of a feature may be changed during operation. For example, if a user's gaze is directed to information pane 1030V, it may be visually presented with an opaque color instead of a transparent color (e.g., so that the user can more easily focus on information pane 1030V). In some examples, shaders may further define a contrast ratio between colors in the shader and surrounding colors in the real-world imagery and/or surrounding AR features. For example, a 3D element may define a contrast ratio relative to a 2D background canvas. In some examples, the UI may include one or more overlaid elements such as icons, text, control elements (e.g., buttons, input fields, etc.), for example presented as a 2D overlay or as 3D objects presented at or near the viewing plane. In some examples, the UI may include a "chaperone" overlay that visually indicates constraints of the physical space, e.g., outlines, bounding boxes, walls, indicating the extent of the useable physical space in which a user may safely interact with AR (e.g., without bumping into anything or leaving the useable area of sensors/displays of the AR system).

Whenever UI elements are presented (e.g., UI overlay elements and/or chaperone overlay) with a designated color, transparency value and/or contrast ratio, the color, transparency and/or contrast ratio may be adapted with regard to colors in the background, the color profile and/or the complementary color palette. For example, as a transparency of a render color in the foreground is changed, the apparent color of the foreground feature may change due to an apparent blend between the foreground color and color(s) in the background. Accordingly, the designated transparency value may be adapted so that the feature, as visually presented over the real-world environment with the designated render color and such adapted transparency value, has an apparent blended color with at least the predefined difference in hue of the apparent blended color relative to a color measured for the real-world environment.

Accordingly, the apparent, blended color may no longer be highly visible relative to other, nearby colors. For example, an orange object may be visible relative to purple surroundings, but if the orange object is drawn with a non-zero transparency value over a blue background, the orange object may appear to be more similar to the purple color of the surroundings. Accordingly, transparency levels, contrast ratios, and/or colors from the complementary palette may be adjusted based on the color profile. In the above example, the orange color may be made more visible in numerous ways, for example, by reducing the transparency value of the orange color, increasing a contrast ratio between the orange color and the surrounding purple color, and/or changing a hue of the orange color (e.g., to a yellow color, so that the resulting blended green color will remain visible relative to the purple surroundings). The techniques presented herein for selecting and/or adjusting palette colors (e.g., based on a sufficient difference in hue, as described above) may be used in any suitable manner to achieve the desired adjustment.

As described above, complementary palette colors may be selected so as to be highly visible compared to real-world environment features. Accordingly, method 200 further includes, at 206, visually presenting an augmented reality feature via the augmented reality display at a render location and with a render color from the complementary palette of user interface colors, with the render color having at least a predefined difference in hue relative to a color measured for the real-world environment corresponding to the render location.

Figure 5A:
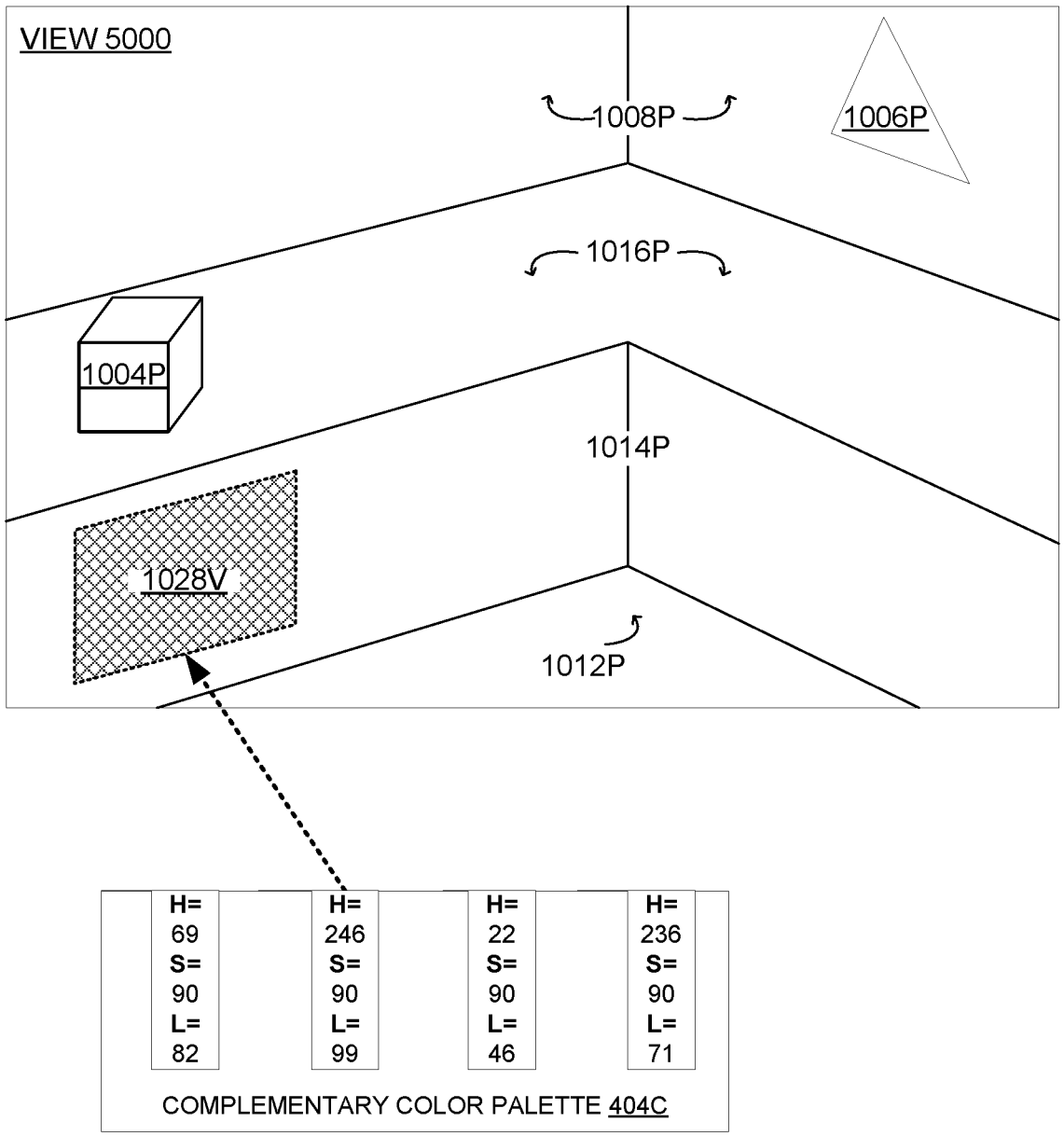
FIG. 5A shows an example selection of a color and location for displaying augmentations.

For example, FIG. 5A shows a view 5000 through an augmented reality display (e.g., a view through augmented reality display 110 of the scene imaged by camera 104, similar to view 1000). As depicted, a first augmentation in the form of information pane 1028V is visually presented in view 5000. The augmentation is visually presented with a blue color (H=246, S=90, L=51) from the complementary palette. The selected blue color is complementary as compared to the yellow-gray color of the workbench sides 1014P (e.g., represented by color bucket (H=66, S=8, L=49)).

In some examples, all of the colors from the palette may have at least a predefined difference in hue relative to all of the color buckets, and accordingly, render color may be selected irrespective of render location. In other examples, the render color and the render location may be jointly selected based on a difference in hue between the render color and the color measured for the real-world environment corresponding to various candidate render locations. For example, the location and color for information pane 1028V may be selected based on finding a contiguous region with colors corresponding to a single color bucket in the color profile, wherein the contiguous region has at least enough space for information pane 1028V. Accordingly, the render color may be selected based on being a complementary color with regard to the single corresponding color bucket.

Figure 5B:
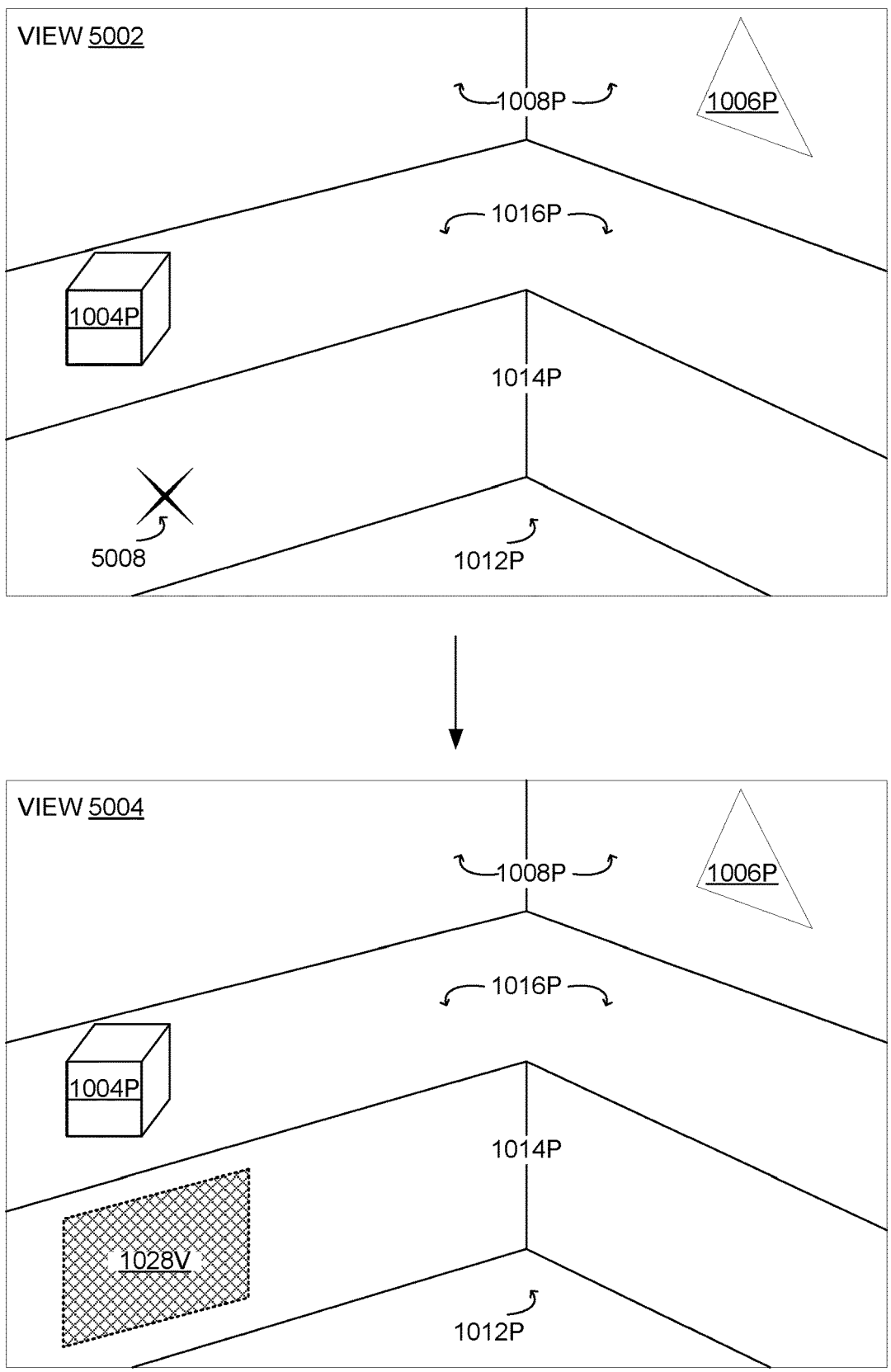
FIG. 5B shows an example selection of a color for displaying augmentations based on a designated location for the augmentations.

In some examples, as shown in FIG. 5B, the render location is a designated render location 5008, and the render color is selected based on difference in hue relative to the color measured for the real-world environment corresponding to the render location. For example, the render location may be a fixed location defined by an augmented reality application, and/or a position defined by proximity to a real-world feature. Accordingly, at 208, method 200 includes visually presenting an augmented reality feature via the augmented reality display, at a designated render location, with a render color selected from the palette of user interface colors based on having at least a predefined difference in hue of the render color relative to a color measured for the real-world environment corresponding to the designated render location.

In some examples, the render color is a designated render color from the complementary palette of user interface colors. Accordingly, the render location may be selected based on difference in hue relative to the designated render color. Accordingly, at 210, method 200 includes visually presenting an augmented reality feature via the augmented reality display, with a designated render color selected from the plurality of user interface colors, at a render location selected based on having at least a predefined difference in hue of the designated render color relative to a color measured for the real-world environment corresponding to the render location. In other words, a specific color it to be used, and then a render location is selected due to it having a color that is sufficiently distinct from the color.

Figure 5C:
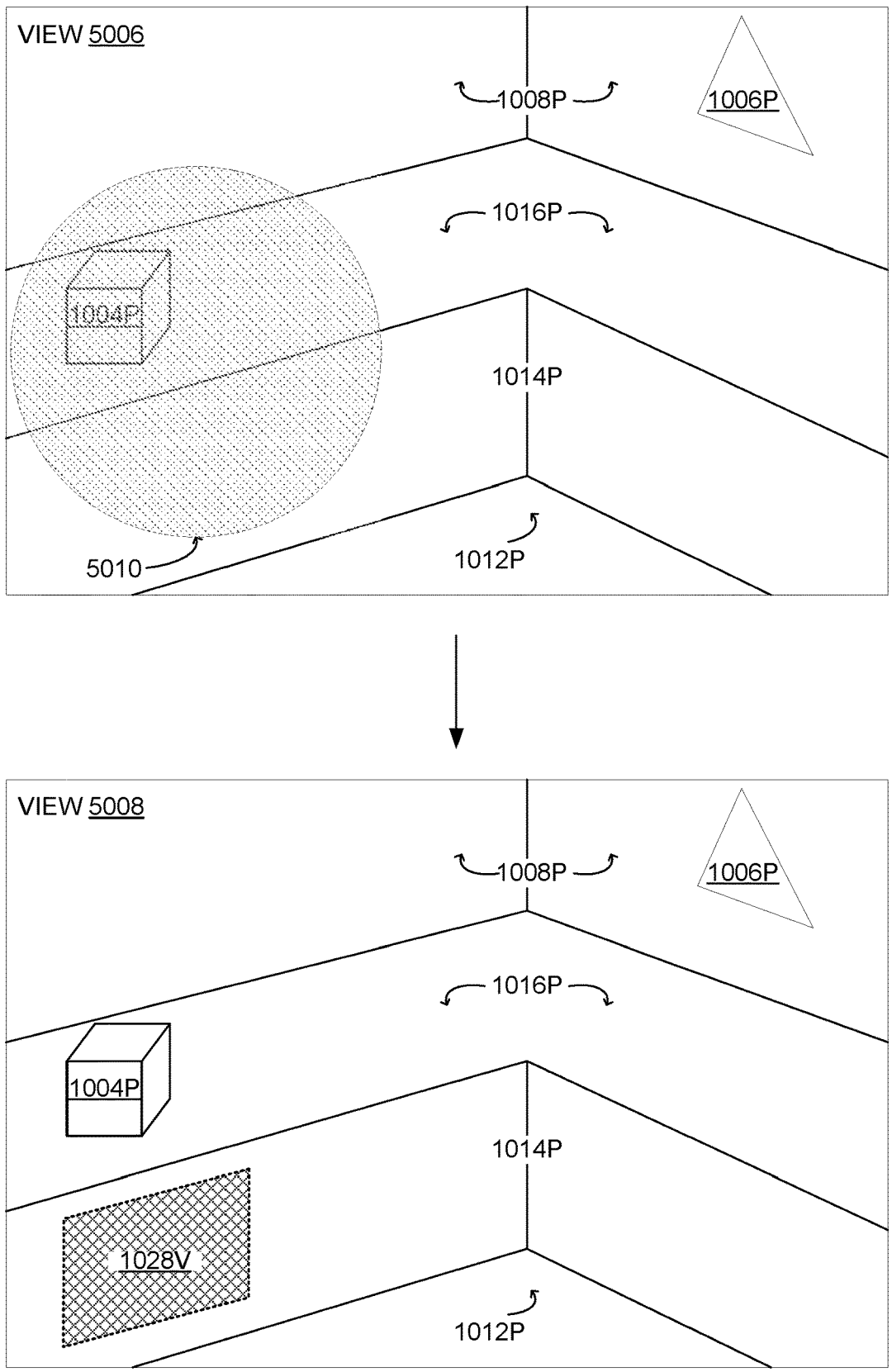
FIG. 5C shows an example selection of a location for displaying augmentations based on a designated color for the augmentations.

In some examples, as shown in view 5006 of FIG. 5C, there may be a desired render area 5010, e.g., an application-defined render area. The render location may be selected from within the desired render area. Accordingly, the augmented reality feature may be presented at an appropriate location as defined by the render area as shown in view 5008, while also picking the best possible location to achieve high visibility relative to the colors in the real-world environment. Although depicted as a 2D region in view 5006, the desired render area may be indicated by an augmented reality application in any suitable fashion, e.g., as a 2D area defined by a circle, rectangle, or curved bounding region, and/or as a 3D volume defined by a cube, sphere, mesh, and/or curved surface.

In some examples, colors in the complementary color palette may be selected based on adjusting one or more predefined colors. For example, the predefined colors may include developer-specified colors, application-defined colors, user-defined colors, common named colors (e.g., red, white, and blue), or any other suitable colors. Accordingly, the predefined colors may be adjusted, with regard to the color profile, to increase visibility relative to the surrounding environment. For example, the hue, luminance, and/or saturation of a predefined color may be adjusted in small increments, and checked with regard to any suitable criterion such as sufficient difference in hue or based on a perceptual model of color distinguishability. In some examples, color distinguishability, color selection, and/or color adjustments may be with regard to a perceptual model of color visibility that takes into account a white balance profile of the environment, and/or a visual mismatch of a user (e.g., color blindness condition of the user).

In some examples, although colors in the color palette may have sufficiently different hues from other colors in the color palette, colors in the color profile and/or colors in the real-world surroundings, the colors may be indistinguishable to a user due to a visual mismatch, e.g., colorblindness. Accordingly, method 200 includes assessing a colorblindness condition, and adjusting the complementary palette based on the colorblindness condition. In some examples, the colorblindness condition may be indicated by a configuration setting, e.g., a user-defined setting in a menu allowing a user to specify no colorblindness condition, or one of a plurality of known colorblindness conditions (e.g., red-green colorblindness, and/or a specific form of red-green colorblindness such as deuteranopia or deuteranomaly). In some examples, the colorblindness condition may be detected automatically based on user interaction with a configuration tool (e.g., a colorblindness test). When detected in this fashion, the colorblindness condition may be stored as a configuration setting so that the automatic assessment does not need to be performed multiple times (e.g., so that the user only needs to take one colorblindness test). For example, the colorblindness condition may be assessed based on a user profile for an augmented reality display device, detected at a calibration time of the augmented reality display device, and stored as a user-specific configuration setting. In some examples, colors in the color palette may be adjusted with regard to a plurality of colorblindness conditions, e.g., to pick a color palette with colors that are readily distinguishable (from each other and from the color profile/environment) for a wide variety of different users with potentially different color vision conditions.

Based on the colorblindness condition, the color palette may be adjusted and/or initially selected to avoid a visual mismatch in which a color from the palette is difficult to distinguish from other colors in the palette, and/or from colors in the color profile. Furthermore, when visually presenting an augmentation (e.g., as described above with regard to FIG. 5A), the color for the augmentation may be adjusted based on the colorblindness condition to avoid a visual mismatch in which the color for the augmentation is difficult to distinguish from the surrounding environment at the location for the augmentation. As an example, for a color profile including predominantly blue colors, a complementary palette may include a red color and a green color that have sufficiently different hue relative to each other and relative to the predominantly blue colors in the color profile. However, if a red-green colorblindness condition is assessed, the red color and green color may be difficult to distinguish. Accordingly, the palette could be adjusted, e.g., by darkening or lightening one of the red color or the green color, by adjusting saturation for one of the colors, and/or by changing one or both hues to increase a difference between the palette colors while preserving the sufficient difference in hue from the blue colors of the color profile. More generally, the complementary palette colors may be adjusted in any suitable manner and the adjustment may be validated with a perceptual model of colorblindness, e.g., by ensuring that each color is readily distinguishable from all other colors (or, e.g., from at least a threshold proportion of other colors) under the perceptual model.

In addition to recognized forms of color blindness, the palette may be adjusted to correct other forms of visual mismatch, for example, a user specified mismatch indicating colors that may be prone to confusion. Visual mismatches may be recognized and/or corrected using any suitable combination of state-of-the-art and/or future techniques. Visual mismatches may be detected for colors in the color palette, with regard to other colors in the palette and/or with regard to the color profile and real-world imagery, using any suitable model, e.g., a predefined mathematical mapping, a machine learning model, a biological model, a perceptual model, etc.

In some examples, the surrounding real-world environment may be illuminated by colored light that may affect the overall white balance of the real-world imagery. For example, when illuminated by a green flood light, all surfaces in the surroundings may have a green tint. Accordingly, measuring the color profile may include determining a white balance profile, and the complementary palette may be adjusted based on the white balance profile. The white balance profile may be assessed in any suitable manner, for example, by measuring a hue of a brightest object in the scene, measuring a hue of an object having a known color, and/or measuring an average hue in the scene. The adjustment to the complementary palette may include any suitable correction(s) based on the white balance profile. As an example, the adjustment may include adjusting a brightest color of the palette to match an inferred "white" color in the environment. As another example, the adjustment may include one or more adjustments based on a perceptual model of eye fatigue, e.g., increasing or reducing saturation based on the white balance profile indicating an extremely bright and/or high-saturation environment.

As an example, assessing the white balance profile may include assessing an object to be neutral (e.g., achromatic white or gray colors), despite an apparent chromatic hue of the color under a current environmental lighting condition. For example, a particular surface such as a wall may be known to be white or gray, although it may be currently illuminated with a green flood light. Assessing a neutral object may be performed in any suitable manner, for example, by assessing a lightest object in the environment to be neutral, assessing a specific recognizable object to be neutral (e.g., using recognition with any suitable computer vision techniques, recognition via bar-code, etc.), and/or any other suitable methods of assessing a neutral color for a scene. Accordingly, color values for virtual objects may be transformed so that virtual objects designated to be drawn with a neutral color are matched to the color of a neutral object under the current illumination (e.g., so that a virtual white object would be drawn with a green tint corresponding to the environment with the green flood light). As a non-limiting example, the color values may be transformed by assessing an RGB calibration color for a light, neutral object in the environment under the current illumination (e.g., assessing an 8-bit RGB value of R=230, G=255, B=230 for a white object under green illumination), then using this calibration color to adjust other color values (e.g., by scaling the RGB channels by 255 divided by the corresponding channel value of the calibration color).

As an example of adaptively adjusting a color palette that includes predefined colors, the predefined colors may include a predefined white color, a predefined blue color, a predefined red color, and a predefined green color. However, the environment may have a uniform yellow lighting so that white objects appear yellow. Furthermore, the environment may include a number of physical features having a similar blue color to the predefined blue color. Furthermore, a user may have a colorblindness condition (e.g., deuteranopia), wherein red and green colors may be visually indistinguishable. Accordingly, the predefined colors in the palette may be adjusted in any suitable manner. For example, the white color in the palette may be changed to a yellow color that more closely matches the visual appearance of white objects under the uniform yellow lighting. Furthermore, the blue color in the palette may be changed to a different color (e.g., bright pink) that has a greater difference in hue from the blue objects in the surroundings. Finally, the red and green colors may be changed (e.g., by increasing a contrast in luminance and/or increasing a difference in hue relative to each other), for example to obtain a dark red color and a bright chartreuse color which may be more easily visually distinguished by the user despite the color blindness condition. In addition to adjusting pre-defined colors, the complementary color palette may include any suitable number of additional colors. As a non-limiting example, based on the yellow lighting and blue objects in the scene, the color palette may include additional pink and/or magenta colors having a sufficient difference in hue relative to objects in the scene. These example adjustments are non-limiting, and the techniques described in the present disclosure may be used in any suitable manner to adjust and/or select colors from the palette. As described herein, the selection and/or adjustment are performed with regard to the color profile as well as with regard to white balance, visual mismatch, and/or with regard to any other state-of-the-art and/or future perceptual model of color vision, etc.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 6:
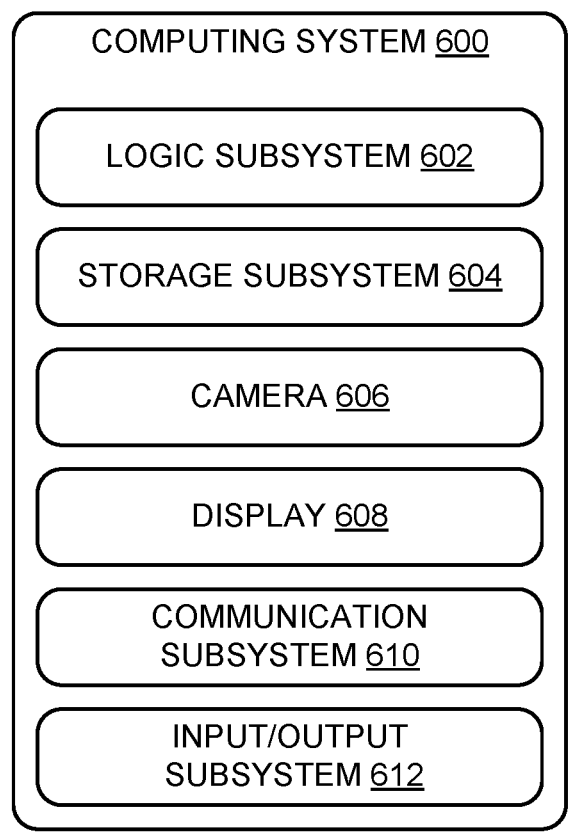
FIG. 6 shows an exemplary computing system.

FIG. 6 schematically shows a simplified representation of a computing system 600 configured to provide any to all of the compute functionality described herein. Computing system 600 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 600 includes a logic subsystem 602 and a storage subsystem 604, a camera 606, and a display 608. Computing system 600 may optionally include an input/output subsystem 612, communication subsystem 610, and/or other subsystems not shown in FIG. 6.

Camera 606 may be any suitable technology for imaging an environment, e.g., a visible light cameras. For example, camera 606 may be a camera 104 of computing system 100, including any suitable combination of camera technologies as described above with regard to FIG. 1. Display 608 may include any suitable display technologies, for example augmented reality displays, virtual reality displays, and/or conventional displays. For example, display 608 may be a display 110 of computing system 100. Accordingly, display 608 may include any suitable combination of display technologies as described above with regard to FIG. 1. Input/output subsystem 612 includes any suitable input devices, e.g., keyboard, mouse, touchscreen, joystick, and other devices. In some examples, input/output subsystem 612 includes accelerometer devices and/or other sensor devices configured to measure motion and/or position in space, e.g., motion of a controller held or worn by a user. In some examples, input/output subsystem 612 is configured to recognize imagery from camera 606 as input, e.g., to recognize gestures by users. In some examples, input/output subsystem 612 may be configured to recognize virtual inputs from one or more virtual input devices, e.g., virtual interactive button 1032V depicted in FIG. 1.

Logic subsystem 602 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 604 includes one or more physical devices configured to temporarily and/or permanently hold computer information such as data and instructions executable by the logic subsystem. When the storage subsystem includes two or more devices, the devices may be collocated and/or remotely located. Storage subsystem 604 may include volatile, nonvolatile, dynamic, static, read/write, read-only, random-access, sequential-access, location-addressable, file-addressable, and/or content-addressable devices. Storage subsystem 604 may include removable and/or built-in devices. When the logic subsystem executes instructions, the state of storage subsystem 604 may be transformed—e.g., to hold different data.

Aspects of logic subsystem 602 and storage subsystem 604 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices. As an example, controller 102 of computing system 100 may be instantiated as a logic machine, for example by executing instructions to implement method 200.

In an example, a method of determining a graphical user interface color palette for augmented reality includes: measuring, via determination of hue, a color profile for a displayed portion of a real-world environment visible via an augmented reality display; selecting a complementary palette of user interface colors, each of such user interface colors having at least a predefined difference in hue relative to one or more colors in the color profile; and visually presenting an augmented reality feature via the augmented reality display, at a designated render location, with a render color selected from the complementary palette of user interface colors based on having at least the predefined difference in hue of the render color relative to a color measured for the real-world environment corresponding to the designated render location. In this or any other example, each of the user interface colors of the complementary palette has at least a predefined difference in luminance relative to one or more colors in the color profile. In this or any other example, the augmented reality feature has a designated transparency value, the method further including adapting the designated transparency value so that the feature, as visually presented with the render color and such adapted transparency value, has an apparent blended color having at least the predefined difference in hue of such apparent blended color relative to the color measured for the real-world environment. In this or any other example, the predefined difference in hue is a difference in hue angle between 160 and 180 degrees. In this or any other example, the method further includes ranking each user interface color of the complementary palette based on difference in hue between the user interface color and the color measured for the real-world environment corresponding to the designated render location, wherein the selected render color is among a predefined number of highest ranked colors. In this or any other example, measuring the color profile includes determining a white balance profile, the method further including adjusting the complementary palette based on the white balance profile. In this or any other example, the method further includes assessing a colorblindness condition, and adjusting the complementary palette based on the colorblindness condition.

In an example, a method of determining a graphical user interface color palette for augmented reality includes: measuring, via determination of hue, a color profile for a displayed portion of a real-world environment visible via an augmented reality display; selecting a complementary palette of user interface colors, each of such user interface colors having at least a predefined difference in hue relative to one or more colors in the color profile; and visually presenting an augmented reality feature via the augmented reality display, with a designated render color selected from the plurality of user interface colors, at a render location selected based on having at least the predefined difference in hue of the designated render color relative to a color measured for the real-world environment corresponding to the render location. In this or any other example, the predefined difference in hue is a hue angle between 160 and 180 degrees. In this or any other example, the predefined difference in hue is a hue angle between 90 and 270 degrees. In this or any other example, each of the user interface palette colors of the complementary palette has at least a predefined difference in luminance relative to one or more colors in the color profile. In this or any other example, measuring the color profile includes determining a white balance profile, the method further including adjusting the complementary palette based on the white balance profile. In this or any other example, the method further includes assessing a colorblindness condition, and adjusting the complementary palette based on the colorblindness condition.

In an example, an augmented reality device comprises: a camera configured to image a real-world environment; an augmented reality display configured to display the real-world environment and one or more virtual augmentations; and a controller configured to: measure, via determination of hue, a color profile for a displayed portion of the real-world environment visible via the augmented reality display and imaged via the camera; select a complementary palette of user interface colors, each of such user interface colors having at least a predefined difference in hue relative to one or more colors in the color profile; and visually present an augmented reality feature via the augmented reality display at a render location and with a render color from the complementary palette of user interface colors, the render color having at least the predefined difference in hue relative to a color measured for the real-world environment corresponding to the render location. In this or any other example, the render location is a designated render location, and wherein the render color is selected based on difference in hue relative to the color measured for the real-world environment corresponding to the render location. In this or any other example, the render color is a designated render color from the complementary palette of user interface colors, and wherein the render location is selected based on difference in hue relative to the designated render color. In this or any other example, measuring the color profile includes mapping real-world environment colors to a predefined plurality of color buckets. In this or any other example, measuring the color profile further includes assessing, for each color bucket of the predefined plurality of color buckets, a proportion of the real-world environment corresponding to that color bucket. In this or any other example, selecting the complementary palette of user interface colors includes: selecting a bucket of the predefined plurality of color buckets; and selecting a number of the user interface colors for the complementary palette based on the selected bucket. In this or any other example, the selected bucket corresponds to a largest proportion of the real-world environment relative to other buckets of the predefined plurality of color buckets.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The invention claimed is:

1. A method of determining a graphical user interface color palette for augmented reality, including:
   automatically measuring, via determination of hue, a color profile for a displayed portion of a real-world environment visible via an augmented reality display, such displayed portion including a designated render location and locations other than the designated render location, wherein the color profile is based on mapping real-world environment colors to a plurality of color buckets representing the measured color profile of the real-world environment colors;
   for each of the plurality of color buckets in the color profile, automatically mapping each color bucket to one or more of a plurality of predefined user interface colors, each of such user interface colors selected based on having a predefined difference in hue relative to one or more colors in color buckets of the color profile;
   adaptively generating a complementary palette including the plurality of predefined user interface colors, such that each predefined user interface color in the complementary palette maps to at least one color bucket, and such that at least a first predefined user interface color in the complementary palette maps to at least a first color bucket and a second, different color bucket; and
   visually presenting an augmented reality feature via the augmented reality display, at the designated render location, with a render color automatically selected from the complementary palette of user interface colors based on having at least the predefined difference in hue of the render color relative to a color bucket corresponding to the designated render location.

2. The method of claim 1, wherein each of the user interface colors of the complementary palette has at least a predefined difference in luminance relative to one or more colors in the color profile, wherein the complementary palette is adaptively generated based on the colors automatically measured for the color profile, such that the complementary palette automatically adapts to changes in the color profile, and wherein the first predefined user interface color is automatically selected as the render color based on the designated render location corresponding to either the first color bucket or the second color bucket.

3. The method of claim 1, wherein the augmented reality feature has a designated transparency value, the method further including adapting the designated transparency value so that the feature, as visually presented with the render color and such adapted transparency value, has an apparent blended color having at least the predefined difference in hue of such apparent blended color relative to the color measured for the real-world environment.

4. The method of claim 1, wherein the predefined difference in hue is a difference in hue angle between 160 and 180 degrees.

5. The method of claim 1, further including ranking each user interface color of the complementary palette based on difference in hue between the user interface color and the color measured for the real-world environment corresponding to the designated render location, wherein the selected render color is among a predefined number of highest ranked colors.

6. The method of claim 1, wherein measuring the color profile includes determining a white balance profile, the method further including adjusting the complementary palette based on the white balance profile.

7. The method of claim 1, further including assessing a colorblindness condition, and adjusting the complementary palette based on the colorblindness condition.

8. A method of determining a graphical user interface color palette for augmented reality, including:
automatically measuring, via determination of hue, a color profile for a displayed portion of a real-world environment visible via an augmented reality display, such displayed portion including a designated render location and locations other than the designated render location, wherein the color profile is based on mapping real-world environment colors to a plurality of color buckets representing the measured color profile of the real-world environment colors;
for each of the plurality of color buckets in the color profile, automatically mapping each color bucket to one or more of a plurality of predefined user interface colors, each of such user interface colors selected based on having a predefined difference in hue relative to one or more colors in color buckets of the color profile;
adaptively generating a complementary palette including the plurality of predefined user interface colors, such that each predefined user interface color in the complementary palette maps to at least one color bucket, and such that at least a first predefined user interface color in the complementary palette maps to at least a first color bucket and a second, different color bucket; and
visually presenting an augmented reality feature via the augmented reality display, with a designated render color automatically selected from the plurality of user interface colors, at the designated render location selected based on having at least the predefined difference in hue of the designated render color relative to a color bucket corresponding to the designated render location.

9. The method of claim 8, wherein the predefined difference in hue is a hue angle between 160 and 180 degrees.

10. The method of claim 8, wherein the predefined difference in hue is a hue angle between 90 and 270 degrees.

11. The method of claim 8, wherein each of the user interface palette colors of the complementary palette has at least a predefined difference in luminance relative to one or more colors in the color profile.

12. The method of claim 8, wherein measuring the color profile includes determining a white balance profile, the method further including adjusting the complementary palette based on the white balance profile.

13. The method of claim 8, further including assessing a colorblindness condition, and adjusting the complementary palette based on the colorblindness condition.

14. An augmented reality device, comprising:
a camera configured to image a real-world environment;
an augmented reality display configured to display the real-world environment and one or more virtual augmentations; and
a storage machine holding instructions executable by a logic machine, that, when executed, cause the augmented reality device to:
automatically measure, via determination of hue, a color profile for a displayed portion of the real-world environment visible via the augmented reality display and imaged via the camera, such displayed portion including a designated render location and locations other than the designated render location, wherein the color profile is based on mapping real-world environment colors to a plurality of color buckets representing the measured color profile of the real-world environment colors;
for each of the plurality of color buckets in the color profile, automatically map each color bucket to one or more of a plurality of predefined user interface colors, each of such user interface colors selected based on having a predefined difference in hue relative to one or more colors in color buckets of the color profile;
adaptively generate a complementary palette including the plurality of predefined user interface colors, such that each predefined user interface color in the complementary palette maps to at least one color bucket, and such that at least a first predefined user interface color in the complementary palette maps to at least a first color bucket and a second, different color bucket; and
visually present an augmented reality feature via the augmented reality display at the designated render location and with a render color automatically selected from the complementary palette of user interface colors, the render color having at least the predefined difference in hue relative to a color bucket corresponding to the designated render location.

15. The augmented reality device of claim 14 wherein the render color is selected based on difference in hue relative to the color measured for the real-world environment corresponding to the designated render location.

16. The augmented reality device of claim 14, wherein the render color is a designated render color from the complementary palette of user interface colors, and wherein the designated render location is selected based on difference in hue relative to the designated render color.

17. The augmented reality device of claim 14, wherein the color buckets of the color profile are a predefined plurality of color buckets, and measuring the color profile includes mapping real-world environment colors to the predefined plurality of color buckets.

18. The augmented reality device of claim 17, wherein measuring the color profile further includes assessing, for each color bucket of the predefined plurality of color buckets, a proportion of the real-world environment corresponding to that color bucket.

19. The augmented reality device of claim 18, wherein mapping the plurality of color buckets in the color profile to the complementary palette of user interface colors includes:
  selecting a bucket of the predefined plurality of color buckets; and
  selecting a number of the user interface colors for the complementary palette based on the selected bucket.

20. The augmented reality device of claim 19, wherein the selected bucket corresponds to a largest proportion of the real-world environment relative to other buckets of the predefined plurality of color buckets.

\* \* \* \* \*